UNITED STATES PATENT OFFICE.

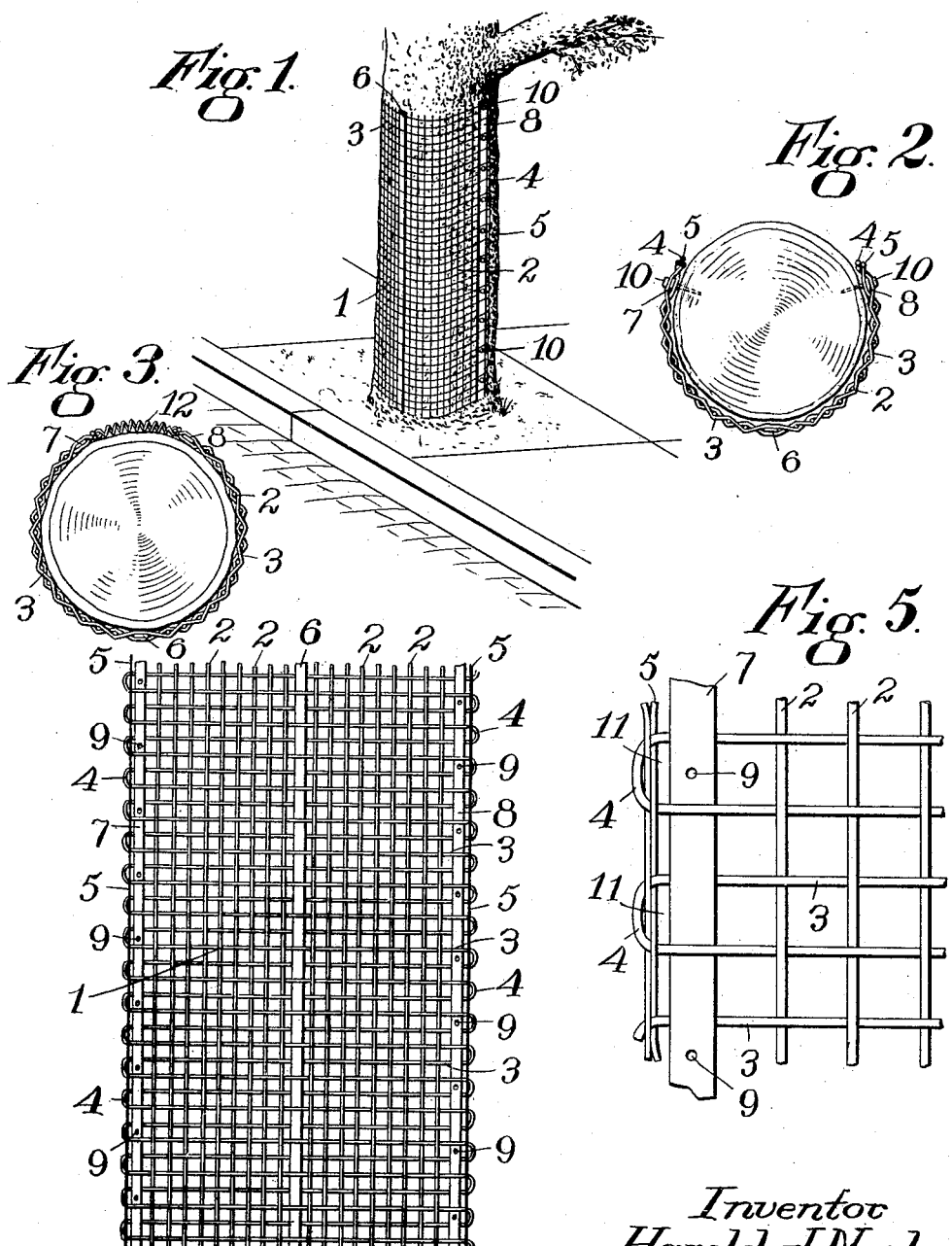

HAROLD J. NEALE, OF WORCESTER, MASSACHUSETTS, ASSIGNOR TO WRIGHT WIRE COMPANY, OF WORCESTER, MASSACHUSETTS, A CORPORATION OF MASSACHUSETTS.

TREE-GUARD.

1,109,779.  Specification of Letters Patent.  Patented Sept. 8, 1914.

Application filed November 29, 1912. Serial No. 733,937.

*To all whom it may concern:*

Be it known that I, HAROLD J. NEALE, a citizen of the United States, residing at Worcester, in the county of Worcester and Commonwealth of Massachusetts, have invented a new and useful Improvement in Tree-Guards, of which the following is a specification accompanied by drawings, forming a part of the same.

The object of my present invention is to provide a durable and serviceable guard for shade or ornamental trees having secure means of attachment which will provide to a certain extent for the future increase in the diameter of the tree.

In the accompanying drawings, Figure 1 represents a tree trunk with one of my improved guards attached thereto. Fig. 2 is a top view of the guard as applied to a tree trunk. Fig. 3 is a top view of the guard applied to a tree trunk showing a modified method of securing the guard to the tree. Fig. 4 is an elevation of a section of a tree guard in extended form. Fig. 5 represents in elevation a portion of a tree guard on a larger scale than that shown in Fig. 4.

Similar reference characters refer to similar parts throughout the different views.

My improved tree guard consists of a body portion of a woven fabric of any suitable form and shape of mesh. In the present instance it consists of a fabric having a rectangular mesh as represented at 1, Fig. 4, and comprising a series of longitudinal wires 2, 2, and a series of transverse wires 3, 3 which are woven together to form a rectangular meshed fabric in a continuous strip of indefinite length which may be cut into lengths suitable for use upon the tree trunk. The transverse wires 3, 3 extend across from side to side forming the weft wires of the woven fabric, with loops 4, 4 upon the selvage edges, the loops being held in shape and the form of the selvage edges preserved by means of selvage wires 5, 5.

Through the central portion of the fabric I insert a reinforcing strip 6 of sheet metal woven into the fabric in the same manner as the longitudinal or warp wires 2, 2, and at each of the selvage edges I insert similar sheet metal strips 7 and 8 woven into the transverse wires 3, but at some distance from the loops 4 and the selvage wires 5 for the purpose hereinafter specified.

The reinforcing selvage strips 7 and 8 are provided with holes 9 through which nails may be inserted and driven into the tree, as represented at 10, Fig. 2.

It is seldom required to extend the guard around the tree trunk except upon its exposed side or side next the street, in the case of a street tree. In most cases it is sufficient to cover one half or two thirds the periphery of the tree by the guard, leaving a gap upon one side of the tree, as shown in Fig. 2. The guard is attached at its edges by means of the nails driven through the holes 9 which attaches the strips 7 and 8 to the tree. A space is left between these strips and the loops 4 so the expansion of the tree trunk by growth may draw the transverse wires 3 past the strips 7 and 8 until the space between the outer edges of the strips 7 and 8 and the loops 4 is taken up. The yielding of the woven body portion of the tree guard to correspond with the growth of the tree prevents the wires forming the meshes from becoming embedded in the bark of the tree until the space shown at 11, Fig. 5, has been taken up on each side of the guard.

In lieu of the nails 10, 10, the selvage edges of the guard may be joined by a series of spiral springs, one of which is shown at 12, Fig. 3. The springs 12 are provided at their ends with hooks which engage loops upon opposite edges of the guard, the tension of the springs being sufficient to hold the guards securely in place. As the tree expands by growth the yielding springs 12 allow the edges of the guard to separate.

I claim,

1. A tree guard comprising a wire fabric having interwoven reinforcing strips adapted to be fastened to the tree trunk, said strips being spaced from the selvage edges of the fabric to permit the latter to yield as the tree expands.

2. A tree guard comprising a rectangle meshed woven wire fabric having longitudinal reinforcing strips interwoven in and spaced from its selvage edges to permit the fabric to yield as the tree expands said strips being adapted to be fastened to the tree with longitudinal interwoven selvage wires outside said reinforcing strips and connecting the loops of the transverse wires of the fabric.

3. A tree guard comprising a woven wire fabric having a central longitudinal reinforcing strip and flat longitudinal perforated reinforcing strips spaced from the looped ends of the transverse wires of the fabric.

4. A tree guard comprising a woven wire fabric having longitudinal reinforcing strips spaced from the looped ends of the transverse wires of the fabric and adapted to be attached to the tree, and an intermediate longitudinal reinforcing strip.

Dated this 26th day of November 1912.

HAROLD J. NEALE.

Witnesses:
PENELOPE COMBERBACH,
NELLIE WHALEN.

Copies of this patent may be obtained for five cents each, by addressing the "Commissioner of Patents, Washington, D. C."